E. F. Bengler.
Tonguing and Grooving Tool.
No. 99,392. Patented Feb. 1, 1870.
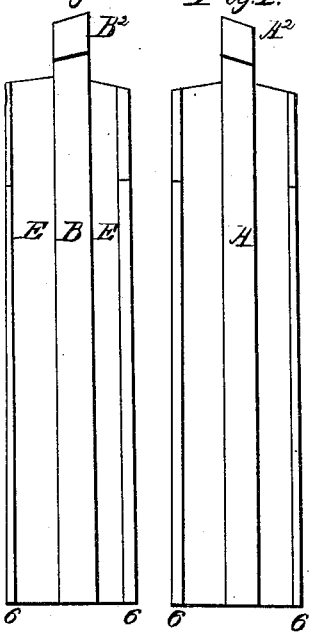

United States Patent Office.

EDWARD F. BEUGLER, OF WILLIAMSPORT, PENNSYLVANIA, ASSIGNOR TO HIMSELF AND GABRIEL S. POST, OF SAME PLACE.

Letters Patent No. 99,392, dated February 1, 1870.

IMPROVEMENT IN TOOLS FOR TONGUING AND GROOVING.

The Schedule referred to in these Letters Patent and making part of the same.

*To all whom it may concern:*

Be it known that I, EDWARD F. BEUGLER, of Williamsport, county of Lycoming, and State of Pennsylvania, have invented a new and improved Set of Tools for Tonguing and Grooving Boards for Flooring, or other similar purposes; and I do hereby declare that the following is a full and exact description thereof, reference being had to the accompanying drawings and to the letters of reference marked thereon.

The nature of my invention consists in making tongue and groove tools with beveled cutting-edges, and so arranged, as regards said edges, that the same are competent to execute the work in a more perfect manner than when performed by the tools now in common use.

To enable others skilled in the art to make and use my invention, I will proceed to describe its construction and operation.

The tools used for grooving are shown in Figures 1, 2, 3, 4, 5, and 6; figs. 5 and 6 showing sections of the same, while the tonguing-tool is shown in Figures 7 and 8, and in the section designated as Figure 9.

These tools are made from steel, of the proper width, thickness, and length, in which, by means of any suitable means, the grooves E E, figs. 1 and 2, are cut on both sides, to the desired depth, leaving a rib, B, in the center, and ribs 6 6 6 6 on the edges of each side, which ribs may be finished as desired.

The center rib B, on the front side of the tool, or, in other words, on the cutting side, is made bevel in its whole length, as shown at B' B', fig. 5, the one rib being beveled from right to left, fig. 5, the other rib being beveled from left to right, fig. 6, by which it will be seen that the grooving tools are in pairs, or are right and left.

The beveled cutting-edges, as seen at $A^2 B^2$, are for the purpose of cutting the sides of the groove clean and smooth, and by which means I do not leave the broken fibres of the wood in the groove, as is the case when the ordinary tool, having its edge straight, is used.

Then, again, a tool, having its edges as described, will remain sharp much longer than if the edges are straight, for very obvious reasons; and then experiment has demonstrated that while the common straight tool requires to be sharpened five or six times each day, under ordinary circumstances, the tool I employ will require to be sharpened but once, or twice at most, to perform the same amount of work, and in a more perfect manner, thus saving a great amount of time.

It will also be seen, that with cutting-edges directed as shown, the amount of power demanded must be much less to achieve the same results, and at the same time the board is not liable to be split or spoiled, provided the grain should not be straight when the beveled tool is used, for it cuts clean and smooth, while the straight-edged tool tears.

It will also be apparent that the tool, when coming in contact with knots, &c., is not so easily broken.

The tonguing-tool, figs. 7, 8, and 9, is made in substantially the same way as the one already described, except that the ribs 10 10 are divided on the back side by a single narrow groove, which corresponds exactly to the width of the tongue, and on the opposite side must be a single rib, resulting from the said grooves.

By means of the grooves, it will be seen that I have a much lighter tool, and one which, as the tool wears, the cutting-edges are more easily repaired, and the amount of filing to be done must be greatly diminished, thereby saving labor as well as files.

It will be noticed, that in my tonguing-tool, I present to the edge of the board an entire cutting-surface, and so absolutely obviate tearing up the wood, and leaving the tongue rough, as is the case with the tools now in use.

Having described my invention in its construction and operation,

What I claim, and for which I desire Letters Patent to issue, is—

The tonguing and grooving-tools C and B, when constructed substantially as shown and described, for the purposes specified.

E. F. BEUGLER.

Witnesses:
W. C. DRANF,
E. KEELER.